Figure 1:
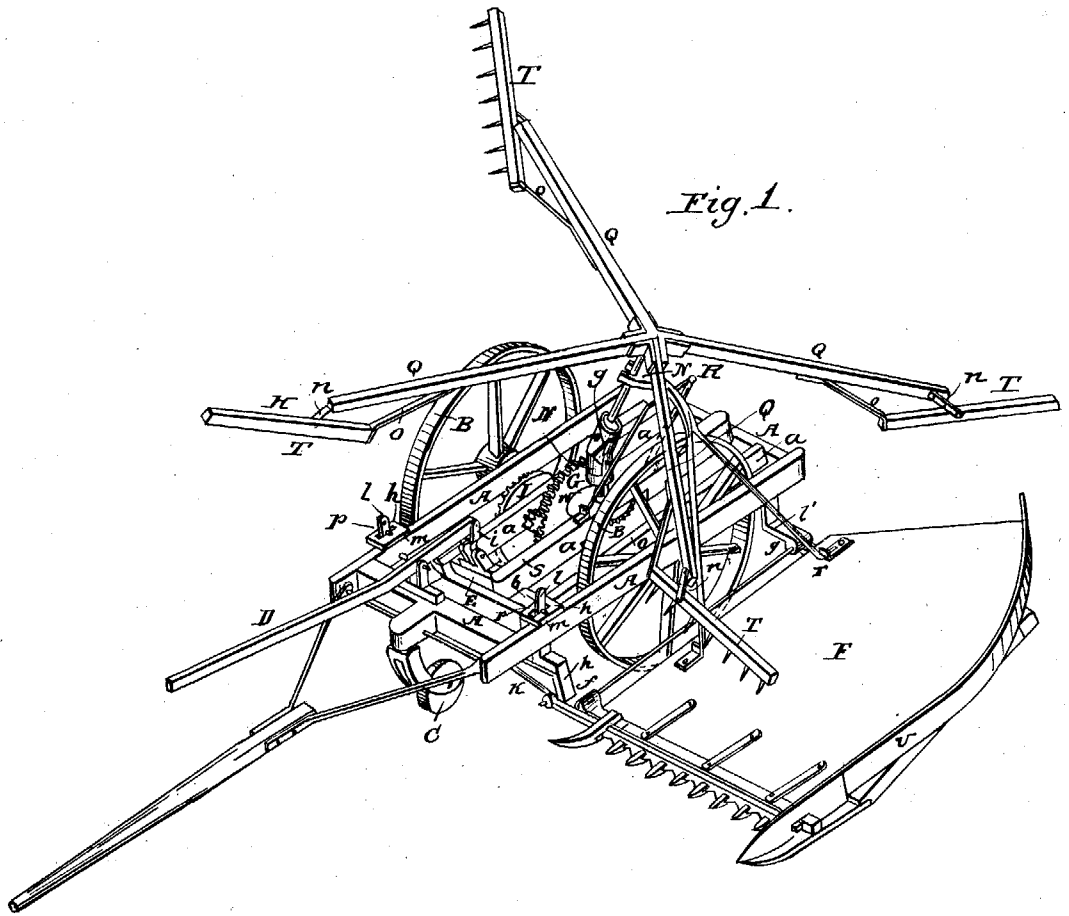

S. A. LINDSAY.

Harvester Rake.

No. 2,438.

Reissued Jan'y 1, 1867.

Witnesses:
Chas. Jancyman
Norman B. Smith

Inventor.
C. Aultman
by his Attorney
A. M. Smith

N. PETERS, Photo-Lithographer, Washington, D. C.

UNITED STATES PATENT OFFICE.

C. AULTMAN, OF CANTON, OHIO, ASSIGNEE, BY MESNE ASSIGNMENTS, OF S. A. LINDSAY.

IMPROVEMENT IN RAKES FOR HARVESTERS.

Specification forming part of Letters Patent No. 30,882, dated December 11, 1860; reissue No. 2,438, dated January 1, 1867.

*To all whom it may concern:*

Be it known that STEPHEN A. LINDSAY, late of Unionville, in the county of Frederick and State of Maryland, did invent certain new and useful Improvements in Automatic Rakes for Harvesters, for which Letters Patent were granted December 11, 1860; and that the following is a full, clear, and exact description of the construction and operation of the same, reference being had to the accompanying drawings, in which—

Figure 1 is a perspective view of a harvester to which the said rake attachment is applied.

The invention consists in the combination of a hinged platform with an automatic and revolving rake, the shaft of which is driven by means of a universal joint, and which shaft is supported by a standard secured to the platform, so as to cause the rake to rise and descend simultaneously with said platform, when the machine passes over uneven or broken ground; and it further consists in connecting the rake and reel heads to the rake and reel shanks by means of a hinge or link, and a restraining-spring, for the purpose of allowing the said heads to yield to the outside board of the platform, when that side rises or lowers in passing over uneven ground.

To enable others skilled in the art to make and use the said invention, the following description is given of construction and operation.

A represents the frame of the machine. It is supported by the carrying and driving wheels B and by the caster-wheel C. This frame is unyielding, and being supported by these three wheels, and having a loose tongue, no part of it bears on the necks of the team. The movable frame E, consisting of the longitudinal pieces *a* and the cross-pieces *b*, is hung to the main driving-shaft, to which the wheels B are secured, and can swing on said shaft. It can be lowered or raised, or retained in any desired position, by means of the lever D, which has its fulcrum on the frame A, at *d*, and to the end of which the frame E is hung by means of the link *e*. The long arm of the lever D extends sufficiently forward to enable the driver, while riding on one of the horses which draw the machine, to operate said lever, and thus to raise or lower the platform. The platform F is hinged at *f g* to the pieces *h i* of the movable frame E, and can freely play on said hinges. The entire gearing of the machine for operating the cutter-bar, as well as that for driving the rake-shaft, is mounted on the movable frame, and when the latter is raised or lowered the platform and rake are moved simultaneously with it, and the relative positions of the different parts are not changed; consequently the perfect working of the parts is not interrupted. The circular guide-pieces *p* of the movable frame E pass through the slots *k* of the frame A, and restrain said frame E from descending below a given point, while it is free to rise above that point in accommodating itself to any projections on the ground.

The gearing of the machine is as follows: The wheel G on the main shaft drives the pinion H, on whose shaft the bevel-wheel I is secured, which, in its turn, drives the crank-pinion, to the crank of which the pitman K is secured, which operates the cutter-bar L. The horizontal bevel-wheel W is operated by a pinion on the main shaft, and turns the shaft I and the fork M of the universal joint *q*, which latter turns the fork O and the inclined rake-shaft P, to which the rake and reel arms Q are secured.

The upper part of the rake-shaft is supported by and turns in a bearing in the upper end of a standard, N, which standard is attached to the platform at *r*, and thus, when the outer end of the platform F is raised or lowered by the machine passing over uneven ground, the upper end of the rake-shaft and the rake are vibrated simultaneously by means of the standard N, and the shaft and rake descend with the platform when the elevation in the ground has been passed over. The upper part of the standard N is prevented from moving sidewise or downward by being hinged to the brace R, which is pivoted at S to the longitudinal bar S of the movable frame. The rake and reel heads T are hung to the arms Q by means of the links *n*, and they are retained in their proper working positions by the action of the springs *o*, one of which is secured by the inner end of each rake-head, and to the lower side of the corresponding rake-arm.

By this connection the rake-heads are made yielding, and will yield so as to conform to the platform. The use of the universal joint and inclined shaft and spring obviates the necessity of a cam to raise and lower the rake and reel, as heretofore done, and is much more simple and effective than the cam movement.

Having thus described the nature of the said invention of said STEPHEN A. LINDSAY, what is claimed herein as new, and desired to be secured by Letters Patent, is—

1. A support for the revolving rake and reel shaft, attached to and moving with the platform of a hinged-bar machine.

2. A support for the revolving rake and reel shaft, attached to and moving with the hinged platform, in combination with a hinged platform suspended to the main frame.

3. A support for the revolving rake and reel shaft, attached to and moving with the hinged platform, in combination with the universal joint for driving said shaft, and conforming the rake and reel to the movement of the platform.

4. An automatic revolving rake, with a universal joint for driving it.

5. The combination of a revolving rake and reel, a hinged platform, and a jointed tumbling driving-shaft.

6. A support for the revolving rake and reel shaft, attached to and moving with the hinged platform, in combination with a driving mechanism, which adapts itself to the rising and falling of the platform in passing over uneven ground.

7. The combination of a revolving rake and reel with a mechanism for adjusting the rake and reel, together with the cutting apparatus and platform, so arranged that the driver can operate it without stopping the machine.

8. The combination of a floating finger-beam machine, a revolving rake and reel, so combined and arranged that the rake and platform shall rise and fall together while reaping, and that the rake and platform may be readily removed for converting it into a mower.

9. The combination of a hinged platform and a continuously-revolving rake-shaft support, located on said platform between the center of the draft-frame and the outer divider.

10. A standard or support which sustains the sweep-rake above the draft-frame or driving-wheels thereof, said standard or support being mounted on the hinged platform.

11. In a harvesting-machine which has its cutting apparatus hinged or jointed to the main frame in such manner as allows it to conform at both ends to the undulations of the ground, and has a rake-support mounted on said-jointed platform, so constructing and arranging the several parts that the support of the rake can occupy a position outside of the inner drive-wheel, or a position which is between the point of suspension of the platform and the outer divider, and so that said platform can also be hung or suspended below the draft-frame.

12. An inclined rake-shaft, a platform, and spring, so arranged that the rake-head shall be elevated sufficiently to pass above the main frame by the mere inclination of the axle, and shall be guided, in passing across the platform, by the sliding of the rake-teeth on the platform, thereby dispensing with the use of a cam for elevating or guiding the rake.

13. A continuously-revolving rake, in combination with a shaft inclined toward the platform, for forcing the rake down to the platform, and then elevating it up and out of the way of the wheels and main frame in its revolution.

C. AULTMAN.

Witnesses:
W. W. CLARK,
J. J. CLARK.